US010611034B1

(12) United States Patent
Rose et al.

(10) Patent No.: US 10,611,034 B1
(45) Date of Patent: Apr. 7, 2020

(54) DETERMINING NULL BIAS OF A HYDRAULIC VALVE OF A ROBOT

(71) Applicant: Boston Dynamics, Inc., Waltham, MA (US)

(72) Inventors: Michael Scott Rose, Arlington, MA (US); Zachary John Jackowski, Somerville, MA (US)

(73) Assignee: Boston Dynamics, Inc., Waltham, MA (US)

( * ) Notice: Subject to any disclaimer, the term of this patent is extended or adjusted under 35 U.S.C. 154(b) by 0 days.

(21) Appl. No.: 16/032,564

(22) Filed: Jul. 11, 2018

Related U.S. Application Data

(63) Continuation of application No. 14/980,196, filed on Dec. 28, 2015, now Pat. No. 10,052,768.

(51) Int. Cl.
*B25J 9/20* (2006.01)
*B25J 9/14* (2006.01)

(52) U.S. Cl.
CPC . *B25J 9/20* (2013.01); *B25J 9/14* (2013.01); *Y10S 901/02* (2013.01); *Y10S 901/22* (2013.01)

(58) Field of Classification Search
CPC ............ F15B 2013/0409; F15B 19/002; F15B 19/005; F15B 13/0402; F15B 2211/6336; B25J 9/20; B25J 9/14; Y10S 901/02; Y10S 901/22; Y10S 901/09; Y10S 901/34; G05B 23/0235; G05B 23/0278
USPC ............ 700/282; 73/1.72, 1.16; 60/328, 393
See application file for complete search history.

(56) References Cited

U.S. PATENT DOCUMENTS

| | | | |
|---|---|---|---|
| 4,078,749 A | 3/1978 | Johnson, Jr. | |
| 4,417,312 A | 11/1983 | Cronin et al. | |
| 5,235,525 A | 8/1993 | Bybee | |
| 5,722,460 A | 3/1998 | Olsen et al. | |
| 6,272,401 B1 | 8/2001 | Boger et al. | |
| 6,282,891 B1 | 9/2001 | Rockwood | |
| 6,341,552 B1 | 1/2002 | Potter et al. | |
| 6,397,655 B1 | 6/2002 | Stephenson | |
| 6,571,190 B2 * | 5/2003 | Hou ........................ | G01L 25/00 |
| | | | 702/105 |
| 7,000,893 B2 | 2/2006 | Yakushi | |
| 7,455,074 B2 | 11/2008 | Shelby et al. | |
| 7,512,460 B2 | 3/2009 | Strosser et al. | |
| 7,866,149 B2 | 1/2011 | Brinkman et al. | |
| 9,279,736 B2 * | 3/2016 | Hughes ................... | G01L 27/00 |
| 9,611,950 B2 | 4/2017 | Kenkel | |
| 2012/0161686 A1 | 6/2012 | Fugate et al. | |
| 2014/0100673 A1 | 4/2014 | Amirthasamy et al. | |

(Continued)

*Primary Examiner* — Michael Leslie
*Assistant Examiner* — Dustin T Nguyen
(74) *Attorney, Agent, or Firm* — Honigman LLP

(57) ABSTRACT

An example method includes identifying an operating state at which a velocity of a hydraulic actuator configured to operate a movable member of a robot is less than a threshold velocity and an actuator force is less than a threshold force, determining a valve command that corresponds to the operating state, such that the valve command is provided to a valve configured to control flow to and from the hydraulic actuator, and the valve includes a spool movable within a body of the valve, and the valve command causes the spool to move within the body of the valve to a position that induces the operating state, and determining a null bias signal based on the valve command.

20 Claims, 12 Drawing Sheets

(56) References Cited

U.S. PATENT DOCUMENTS

| | | | |
|---|---|---|---|
| 2014/0129035 A1* | 5/2014 | Marquette | B62D 5/075 700/282 |
| 2015/0107675 A1* | 4/2015 | Kucera | F16K 37/0033 137/1 |
| 2015/0323936 A1 | 11/2015 | Junk | |
| 2016/0348844 A1 | 12/2016 | Carron et al. | |

* cited by examiner

1100

IDENTIFYING, BY A CONTROLLER OF A ROBOT, AN OPERATING STATE AT WHICH (i) A VELOCITY OF A HYDRAULIC ACTUATOR CONFIGURED TO OPERATE A MOVABLE MEMBER OF THE ROBOT IS LESS THAN A THRESHOLD VELOCITY, (ii) A FORCE APPLIED, OR EXPERIENCED, BY THE HYDRAULIC ACTUATOR IS LESS THAN A THRESHOLD FORCE, AND (iii) A PRESSURE LEVEL OF HYDRAULIC FLUID AT A SOURCE OF PRESSURIZED FLUID IS ABOVE A THRESHOLD PRESSURE LEVEL — 1102

DETERMINING A VALVE COMMAND THAT CORRESPONDS TO THE OPERATING STATE, WHEREIN THE VALVE COMMAND IS PROVIDED TO A VALVE CONFIGURED TO CONTROL FLOW TO AND FROM THE HYDRAULIC ACTUATOR, WHERE THE VALVE INCLUDES A SPOOL MOVABLE WITHIN A BODY OF THE VALVE, AND WHERE THE VALVE COMMAND CAUSES THE SPOOL TO MOVE WITHIN THE BODY OF THE VALVE TO A POSITION THAT INDUCES THE OPERATING STATE — 1104

DETERMINING A NULL BIAS SIGNAL BASED ON THE VALVE COMMAND, WHEREIN THE NULL BIAS SIGNAL, WHEN PROVIDED TO THE VALVE, PLACES THE SPOOL AT A NULL POSITION AT WHICH THE SPOOL SUBSTANTIALLY BLOCKS FLUID FLOW THROUGH THE BODY — 1106

FIGURE 11

DETERMINING NULL BIAS OF A HYDRAULIC VALVE OF A ROBOT

CROSS REFERENCE TO RELATED APPLICATIONS

This U.S. patent application is a continuation of, and claims priority under 35 U.S.C. § 120 from, U.S. patent application Ser. No. 14/980,196, filed on Dec. 28, 2015. The disclosure of this prior application is considered part of the disclosure of this application and is hereby incorporated by reference in its entirety.

BACKGROUND

An example robot may have a plurality of members composing the robot's legs and arms. Motion of these members may be controlled by hydraulic actuators such as hydraulic cylinders and motors. Hydraulic valves control hydraulic fluid flow to and from the actuator. A controller of the robot may thus cause members of the robot to move by controlling these hydraulic valves.

SUMMARY

The present disclosure describes implementations that relate to determining null bias of a hydraulic valve of a robot. In a first example implementation, the present disclosure describes performing the following operations: (i) identifying, by a controller of a robot, an operating state at which (a) a velocity of a hydraulic actuator configured to operate a movable member of the robot is less than a threshold velocity, (b) a force applied, or experienced, by the hydraulic actuator is less than a threshold force, and (c) a pressure level of hydraulic fluid at a source of pressurized fluid is above a threshold pressure level; (ii) determining a valve command that corresponds to the operating state, where the valve command is provided to a valve configured to control flow to and from the hydraulic actuator, where the valve includes a spool movable within a body of the valve, and where the valve command causes the spool to move within the body of the valve to a position that induces the operating state; and (iii) determining a null bias signal based on the valve command, where the null bias signal, when provided to the valve, places the spool at a null position at which the spool substantially blocks fluid flow through the body.

In a second example implementation, the present disclosure describes a robot. The robot includes at least one movable member. The robot also includes a hydraulic system comprising at least (i) a hydraulic actuator configured to operate the movable member, (ii) a valve configured to control flow to and from the hydraulic actuator, and (iii) a source of pressurized hydraulic fluid. The robot further includes a controller configured to perform the following operations: (i) identifying a plurality of operating states, wherein at each operating state of the plurality of operating states (a) a velocity of the hydraulic actuator is less than a threshold velocity, (b) a force applied, or experienced, by the hydraulic actuator is less than a threshold force, and (c) a pressure level of hydraulic fluid at the source of pressurized hydraulic fluid is above a threshold pressure level; (ii) determining a plurality of valve commands that respectively correspond to the plurality operating states, where the valve includes a spool movable within a body of the valve, and where each valve command of the plurality of the valve commands causes the spool to move within the body of the valve to a position that induces a respective operating state of the plurality of operating states; and (iii) determining a null bias signal based on the plurality of valve commands, where the null bias signal, when provided to the valve, places the spool at a null position at which the spool substantially blocks fluid flow through the body of the valve.

In a third example implementation, the present disclosure describes performing the following operations: (i) providing a signal to a valve to cause a spool to move within a body of the valve to allow a work port disposed on the body of the valve to be in fluid communication with a source of pressurized fluid configured to supply hydraulic fluid at a first pressure level such that a pressure level at the work port is substantially equal to the first pressure level; (ii) gradually changing the signal to the valve so as to cause the spool to gradually move in a first direction within the body of the valve until the pressure level at the work port reaches a second pressure level that is lower than the first pressure level, where the pressure level at the work port reaches the second pressure level at a first value of the signal; (iii) maintaining the signal at the first value for a particular period of time so as to allow the pressure level at the work port to decrease below the second pressure level; (iv) gradually changing the signal to the valve so as to cause the spool to gradually move in a second direction opposite the first direction until the pressure level at the work port again reaches the second pressure level, where the pressure level at the work port reaches the second pressure level again at a second value of the signal; and (v) determining a null bias signal based on the first value and the second value, where the null bias signal, when provided to the valve, places the spool at a null position at which the spool substantially blocks fluid flow through the body of the valve.

In a fourth example implementation, the present disclosure describes a non-transitory computer readable medium having stored therein instructions that, when executed by a computing device, cause the computing device to perform operations in accordance with the first example implementation. In a fifth example implementation, the present disclosure describes a non-transitory computer readable medium having stored therein instructions that, when executed by a computing device, cause the computing device to perform operations in accordance with the third example implementation.

A sixth example implementation may include a system having means for performing operations in accordance with the first example implementation. A seventh example implementation may include a system having means for performing operations in accordance with the third example implementation. Further additional example implementations are described as well that include any combination of the implementations.

The foregoing summary is illustrative only and is not intended to be in any way limiting. In addition to the illustrative aspects, implementations, and features described above, further aspects, implementations, and features will become apparent by reference to the figures and the following detailed description. The details of one or more implementations of the disclosure are set forth in the accompanying drawings and the description below. Other aspects, features, and advantages will be apparent from the description and drawings, and from the claims.

DESCRIPTION OF DRAWINGS

FIG. 11 is a flow chart of another method for determining null bias, in accordance with an example implementation.

Like reference symbols in the various drawings indicate like elements.

DETAILED DESCRIPTION

Figure 1:
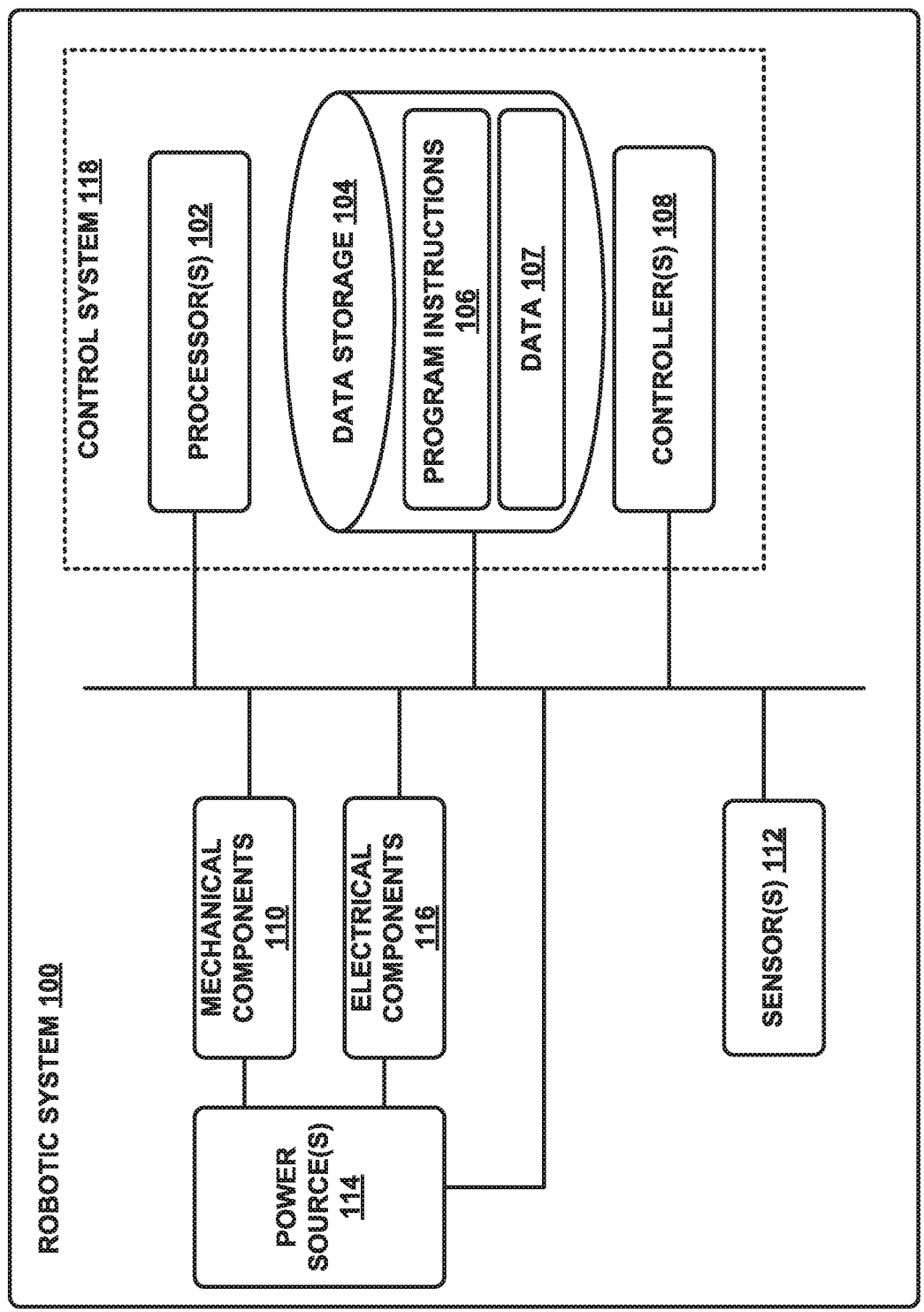
FIG. 1 illustrates an example configuration of a robotic system, in accordance with an example implementation.

The following detailed description describes various features and operations of the disclosed systems with reference to the accompanying figures. The illustrative implementations described herein are not meant to be limiting. Certain aspects of the disclosed systems can be arranged and combined in a wide variety of different configurations, all of which are contemplated herein.

Further, unless context suggests otherwise, the features illustrated in each of the figures may be used in combination with one another. Thus, the figures should be generally viewed as component aspects of one or more overall implementations, with the understanding that not all illustrated features are necessary for each implementation.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

I. Overview

An example robot may include a several movable members (e.g., legs, arms, hands, etc.). In some examples, a hydraulic system may be configured to control motion of such movable members. An example hydraulic system may include a source of pressurized fluid (e.g., a pump or an accumulator), a low pressure fluid reservoir or tank, a plurality of hydraulic valves, and a plurality of hydraulic actuators controlling motion of the movable members of the robot. A controller of the robot may determine a particular task to be performed, and based on such task, may provide commands to the hydraulic valves controlling hydraulic fluid flow to the actuators. The actuators may then cause the movable members of the robot to operate, thus enabling the robot to perform the task.

An example hydraulic valve may include a spool linearly displaceable within a body of the valve. A solenoid or flapper nozzle assembly may be configured to control motion of the spool within the valve body. Ideally, when the controller does not provide a signal to a hydraulic valve (i.e., the signal to the valve is zero amperes or volts), the spool should be at a center or neutral position within the valve body, thus blocking ports disposed on the valve body. That neutral position may be referred to as a null position of the spool. In this manner, hydraulic fluid from the source does not flow to the actuator controlled by the valve, and the actuator remains stationary.

However, in some cases, a zero signal to the valve may not result in the spool being at the null position. For example, due to inaccuracies in the valve, the spool may be slightly shifted away from the null position when no signal is provided to the valve. In another example, the valve may include a spring that biases the spool in one direction such that in case of electric failure, the spool shifts to a safe position that locks the actuator in a desired position. In these cases, the controller may be configured to provide a non-zero null bias signal that, when provided to the valve, shifts the spool to the null position.

Further, a value of the null bias signal may drift overtime while the robot is in service due to changes in supply pressure, operating temperatures, hydraulic fluid cleanliness, wear, among other factors. Such drift may cause inaccuracies in operation of the actuators of the robot. For example, the controller may have access to a pre-stored value for the null bias signal that the controller uses to place the spool at null position to prevent motion of an actuator. Due to drift, however, the null bias signal that the controller provides to the valve may not place the spool at the null position. As a result, the spool may be slightly shifted form the null position causing the actuator to move.

Thus, updating the null bias signal overtime to compensate for any drift may be desirable to maintain accuracy of operation of the robot. Disassembling the valve to determine the drift may cause unwanted downtime for the robot. Disclosed herein are systems and methods for determining the null bias signal and updating the null bias signal in real-time on the robot.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic system 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic system 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic system 100, such as on the body and/or on one or more of the appendages, among other examples.

On its body, the robotic system 100 may carry a load, such as a type of cargo that is to be transported. The load may also represent external batteries or other types of power sources (e.g., solar panels) that the robotic system 100 may utilize. Carrying the load represents one example use for which the robotic system 100 may be configured, but the robotic system 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
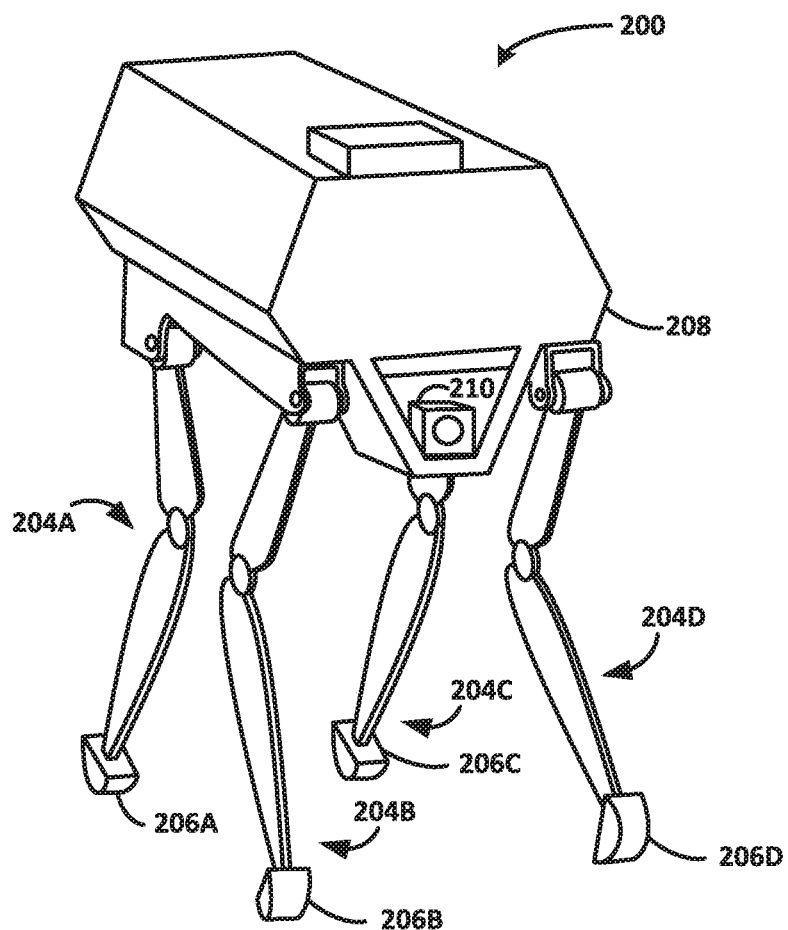
FIG. 2 illustrates a quadruped robot, in accordance with an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
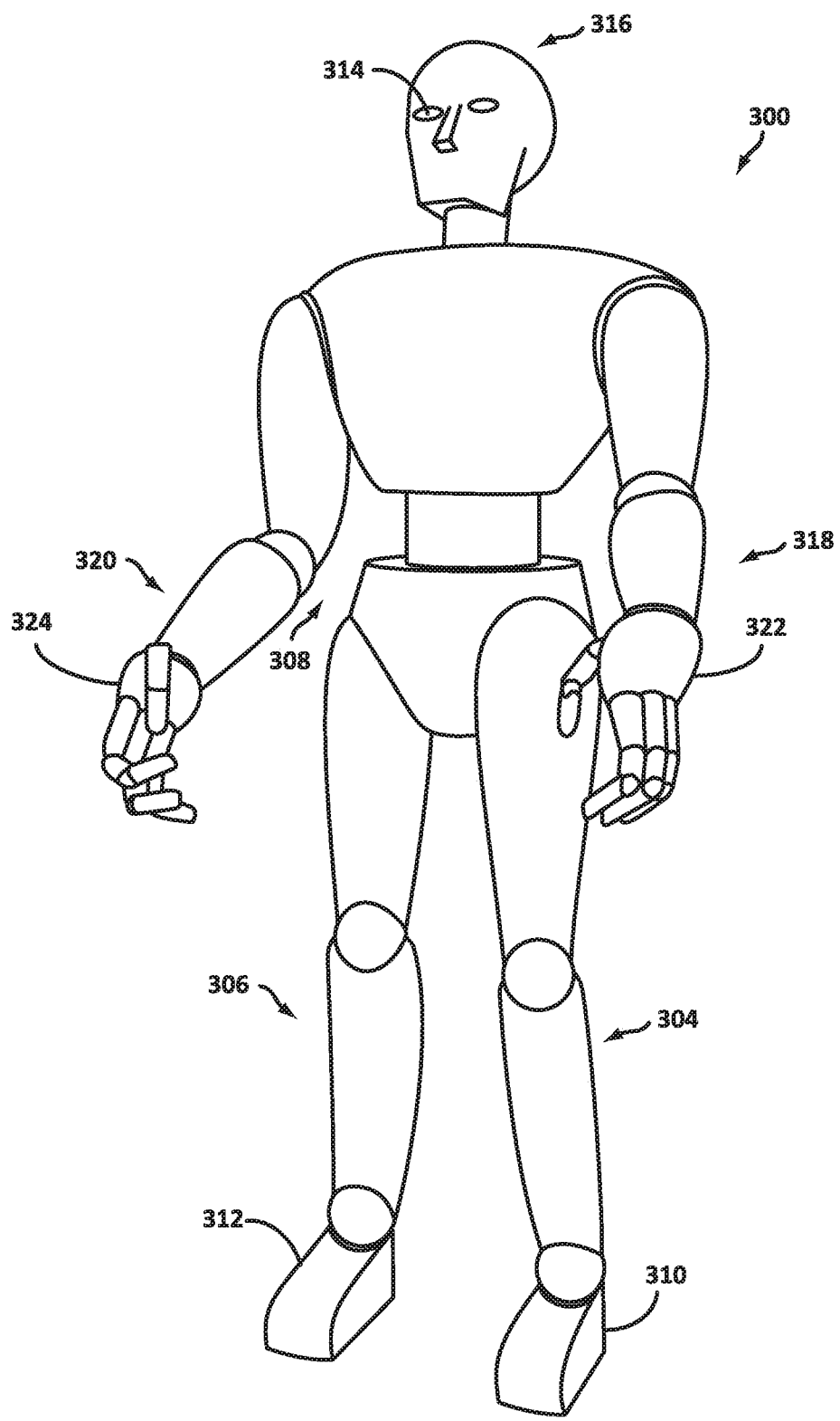
FIG. 3 illustrates a biped robot, in accordance with another example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 (or end-effectors) for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. Example Robotic Members Controlled by Hydraulic Actuators and Valves

Figure 4:
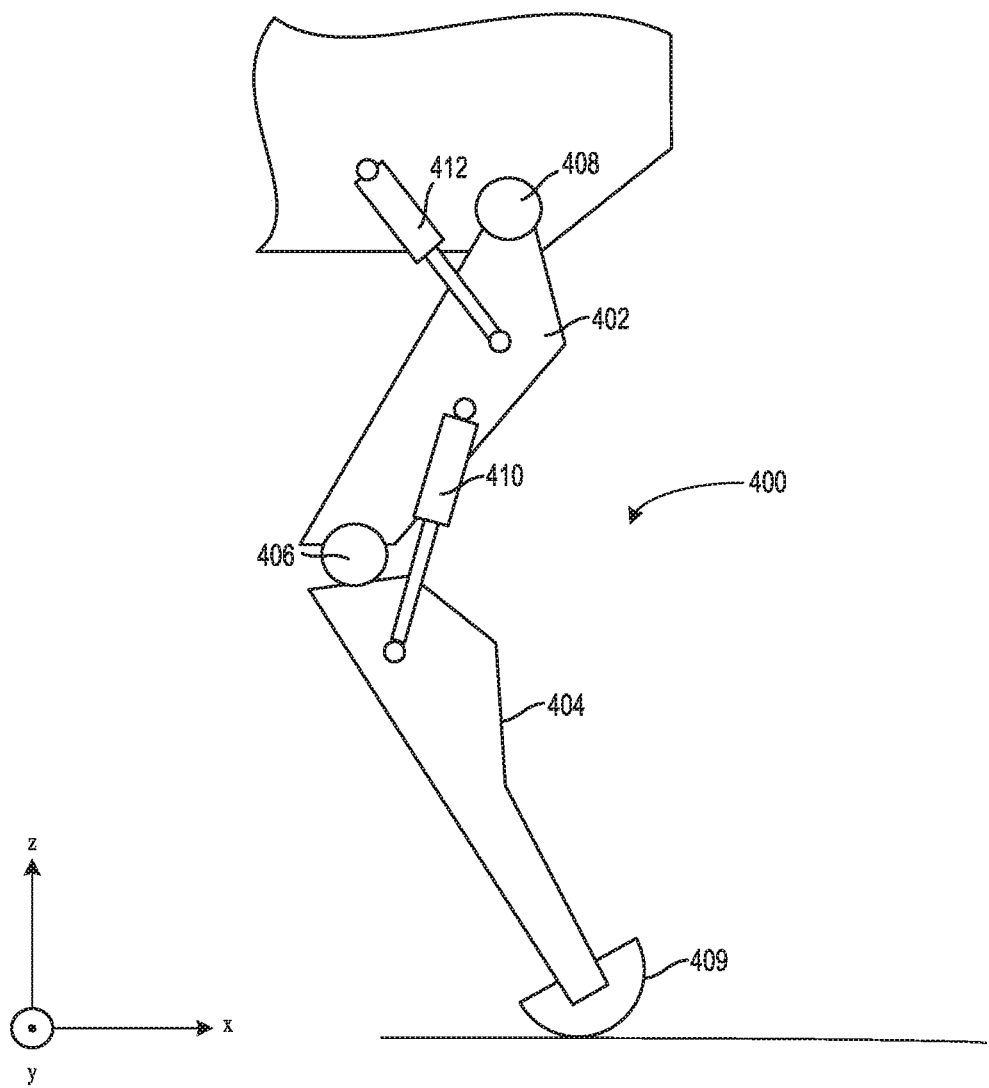
FIG. 4 illustrates a side view of a robotic leg, in accordance with an example implementation.

FIG. 4 is a side-view of an example articulable robotic leg 400, in accordance with an example implementation. The robotic leg 400 includes a member 402 and a member 404. The member 402 has an outboard end that is connected in a rotatable manner to an inboard end of the member 404 at a joint 406. The member 402 has an inboard end that is connected to the robot at joint 408. The member 404 has an outboard end that is connected to a foot member 409. The foot member 409 is depicted in FIG. 4 to be similar to the feet 206A-206D of the robot 200. However, this description applies to other types of feet such as the feet 310 and 312 of the robot 300.

The robotic leg 400 also includes an actuator 410 connected between the member 402 and the member 404. The robotic leg 400 further includes an actuator 412 connected between the member 402 and the robot. In some implementations, the actuators 410 and 412 may be linear actuator cylinders. Operating the actuator 412 causes the member 402 and the member 404 to rotate around joint 408. Similarly, actuation of the actuator 410 causes the member 404 to rotate around the joint 406.

Operating the actuator 410 and the actuator 412 in combination may cause the leg 400 to take a step. For instance, the actuator 410 may retract, which causes member 404 to rotate counter-clockwise (from the perspective shown in FIG. 4) around the joint 406. This rotation may raise the leg 400 up from the ground. The actuator 412 may retract, which causes the member 402 to rotate clockwise (from the perspective shown in FIG. 4) around the joint 408. By rotating the member 402 clockwise around the joint 408, the foot member 409 moves forward relative to the ground. The actuators 410 and 412 may then extend and cause the robotic leg 400 to be lowered and push against the ground, causing the robot to move forward or to adopt a new stance.

Although the side view of the robotic leg in FIG. 4 is shown with the two actuators 410 and 412 that move the robotic leg 400 in two dimensions, the robotic leg 400 may have any number of actuators that allow for more or fewer degrees of freedom. In some cases, the robotic leg 400 may include actuators that allow for lateral movement of the robotic leg 400 (i.e., in and out of the page in the y-direction) in addition to longitudinal movement (i.e., in the x-direction depicted in FIG. 4) and vertical movement (i.e., in the z-direction depicted in FIG. 4).

The robot having the robotic leg 400 may include a hydraulic system that operates the actuators 410 and 412. The actuators 410 and 412 are illustrated as linear hydraulic actuator cylinders. However, the hydraulic system described herein can be used to control other types of hydraulic actuators as well (e.g., hydraulic motors).

Figure 5A:
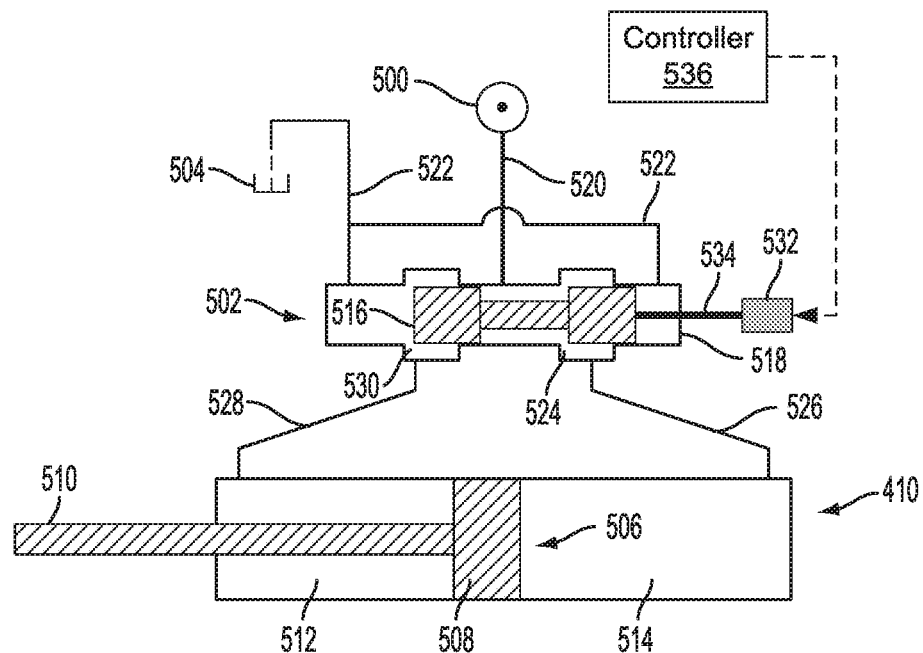
FIGS. 5A-5B illustrate a hydraulic system controlling an actuator of a robotic leg, in accordance with an example implementation.
Figure 5B:
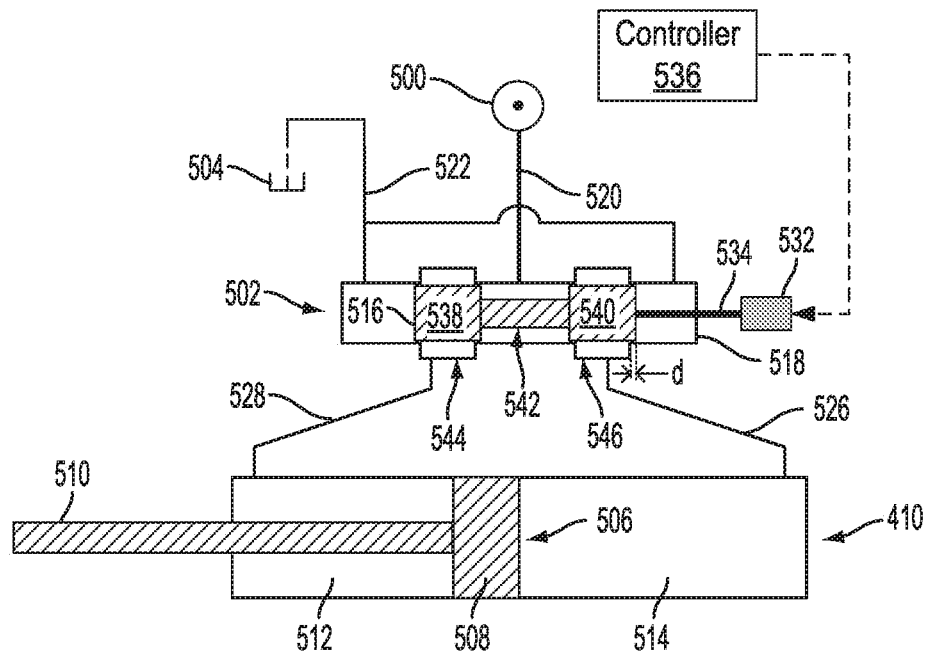

FIGS. 5A-5B illustrate a hydraulic system controlling an actuator of a robotic leg, in accordance with an example implementation. FIGS. 5A-5B show the actuator 410 as an example for illustration. Other actuators of the robot may be controller in a similar manner.

FIG. 5A illustrates a high pressure fluid source 500 configured to provide pressurized fluid. The high pressure fluid source 500 may, for example, be a pump or an accumulator. A hydraulic valve 502 is configured to control flow of hydraulic fluid from the source 500 to the hydraulic actuator 410 and control flow of fluid discharged from the hydraulic actuator 410 to a reservoir 504.

The actuator 410 includes a piston 506 slidably accommodated within a cylinder of the actuator 410. The piston 506 includes a piston head 508 and a rod 510 extending from the piston head 508 along a central axis direction of the actuator 410. The rod 510 is thus coupled to the member 404 shown in FIG. 4. The piston head 508 divides the inside of the cylinder of the actuator 410 into two chambers, 512 and 514. Although the actuator 410 is depicted as a double-acting cylinder, single acting cylinders and other configurations of actuators are contemplated.

The valve 502 has a spool 516 configured to move linearly within a body 518 of the valve 502. The valve 502 is configured to control hydraulic fluid flow to and from the actuator 410 so as to control motion of the piston 506. Particularly, axial position of the spool 516 controls flow from the source 500 through a supply line 520 to one of the two chambers 512 and 514 of the actuator 410. Axial position of the spool 516 further controls flow of fluid forced out from the other chamber to the reservoir 504 by way of a return line 522.

For instance, the spool 516 may be shifted to a given linear position as shown in FIG. 5A. At this position, fluid flows from the source 500 through the supply line 520, an opening 524, and hydraulic line 526 to the chamber 514. Further, fluid is forced out from the chamber 512 through hydraulic line 528 and opening 530 to flow through the return line 522 to the reservoir 504. As a result, the piston 506 extends (i.e., moves left in FIG. 5A).

An electric solenoid, a stepper motor, a torque motor, a hydraulic actuator, or any other actuation device may be used for moving the spool 516. For example, as shown as an example for illustration in FIG. 5A, a solenoid 532 is coupled to a rod 534, which in turn is coupled to the spool 516. Thus, actuating the solenoid 532 by an electric signal causes the rod 534 and the spool 516 to move linearly within the body 518 of the valve 502. In other examples, however, the hydraulic valve 502 may be a servo valve controlled by a torque motor and flapper nozzle assembly or any other actuation mechanism. A solenoid is used herein as an example for illustration.

A controller 536 (e.g., the controller 108) of the robot is configured to cause the robot to perform a particular task. The controller 536 may receive input information indicative of a task to be performed (e.g., a trajectory or a path to be followed), or may determine the task to be performed based on other inputs. The controller 536 may then actuate the hydraulic system to cause the actuators of the robot such as the actuator 410 to move to enable the robot to perform the task.

During operation of the robot, the actuator 410 may require hydraulic fluid so as to move the robotic leg 400. However, in some portions of the task, the actuator 410 may be required to remain stationary. For instance, if the task involves the robot standing up still while picking an object with its arms, robotic leg 400 may be required to remain still. The controller 536 may thus seek to prevent the actuator 410 from moving, and may thus send no signal (i.e., provides a zero amperes or volts signal) to the solenoid 532 to place the spool 516 at a null position.

FIG. 5B illustrates the hydraulic system shown in FIG. 5A while the spool 516 is at the null position. Null position is a condition where the valve 502 supplies zero control flow at zero load pressure drop. In other words, the actuator 410 is held stationary while the spool 516 is at the null position. As shown in FIG. 5B, the spool 516 may have a plurality of substantially cylindrical lands, such as lands 538 and 540, alternately spaced with recessed regions such as region 542. At the null position, the lands 538 and 540 block hydraulic flow through the body 518 of the valve 502 such that fluid from the source 500 is blocked from flowing to either of work ports 544 and 546. The work ports 544 and 546 are disposed on the body 518 and communicate fluid to and from the actuator 410.

To allow the spool 516 to move linearly within the body 518, there may be a clearance between the lands 538 and 540 and the body 518. As such, there might be some leakage flow of hydraulic fluid that leaks from the source 500 around the lands 538 and 540. However, such leakage flow is minimal and would not cause the actuator 410 to move. Further, as shown in FIG. 5B, the spool 516 may be an overlapped spool, which indicates that a length of the lands 538 and 540 exceeds respective lengths of the underlying work ports 544 and 546, respectively. In other words, a distance "d" shown in FIG. 5B is greater than zero. The larger the distance "d," the smaller the amount of leakage. The drawings of the valve 502 and the actuator 410 are not to scale. For example, the distance "d" is exaggerated for illustration.

Ideally, when the controller does not provide a signal to the solenoid 532 (i.e., the signal to the solenoid 532 is zero amperes or volts), the spool 516 should be placed at the null position shown in FIG. 5B, thus blocking the work ports 544 and 546. In this manner, hydraulic fluid from the source 500 does not flow to the actuator 410, and the piston 506 remains stationary.

However, in some cases, a zero signal to the solenoid 532 may not place the spool at the null position. For example, due to inaccuracies in manufacturing the valve 502 or in the electronics controlling the valve, the spool 516 may be slightly shifted away from the null position when no signal is provided to the solenoid 532. In these cases, the controller 536 may be configured to provide a null bias signal that, when provided to the valve, shifts the spool 516 to the null position. Determining the null bias signal enables the controller 536 to accurately operate the robot.

IV. Determining Null Bias

Figure 6A:
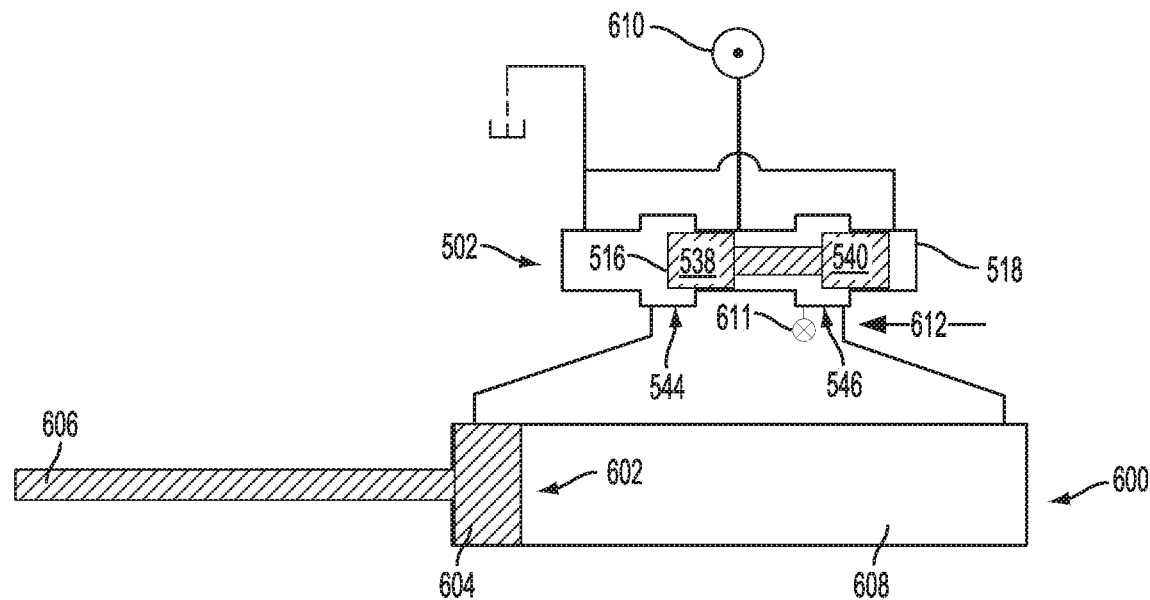
FIGS. 6A, 6B, and 6C illustrate determination of null bias for a valve, in accordance with an example implementation.
Figure 6B:
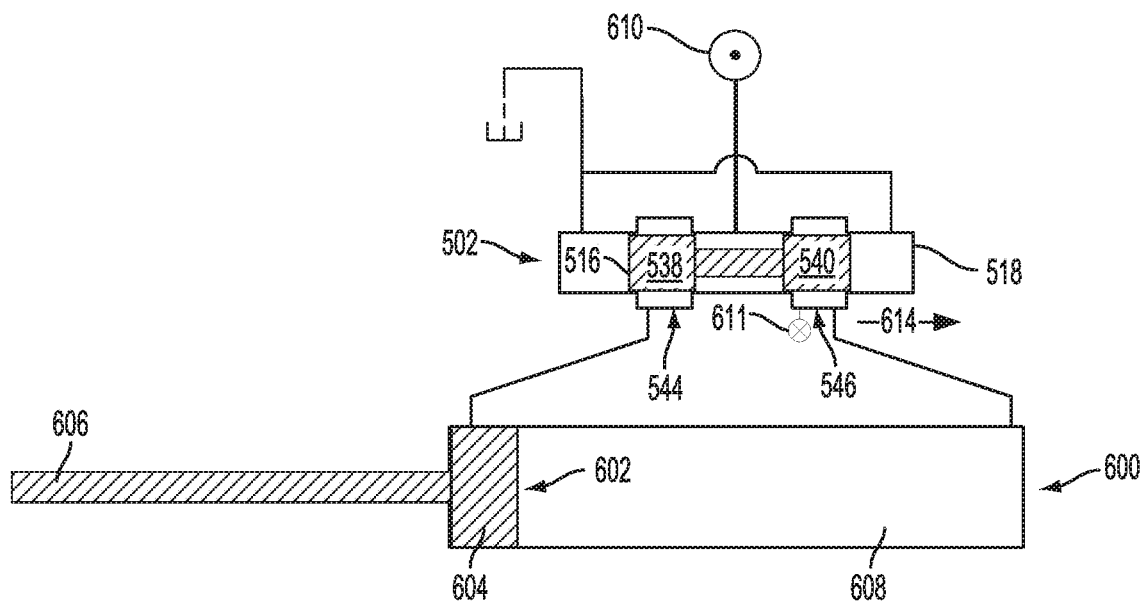
Figure 6C:
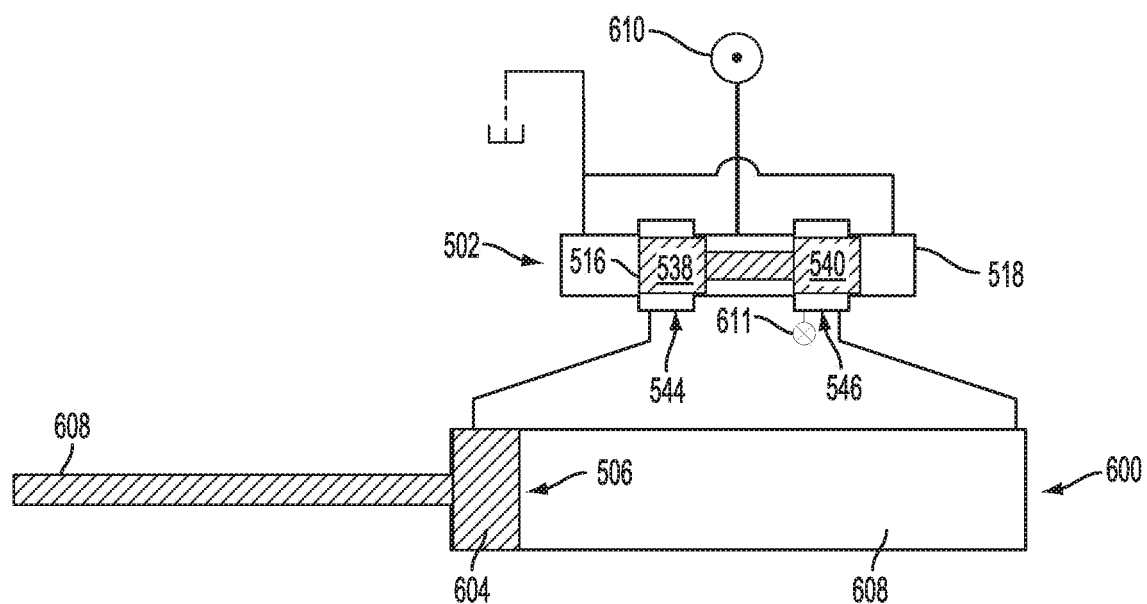
Figure 7A:
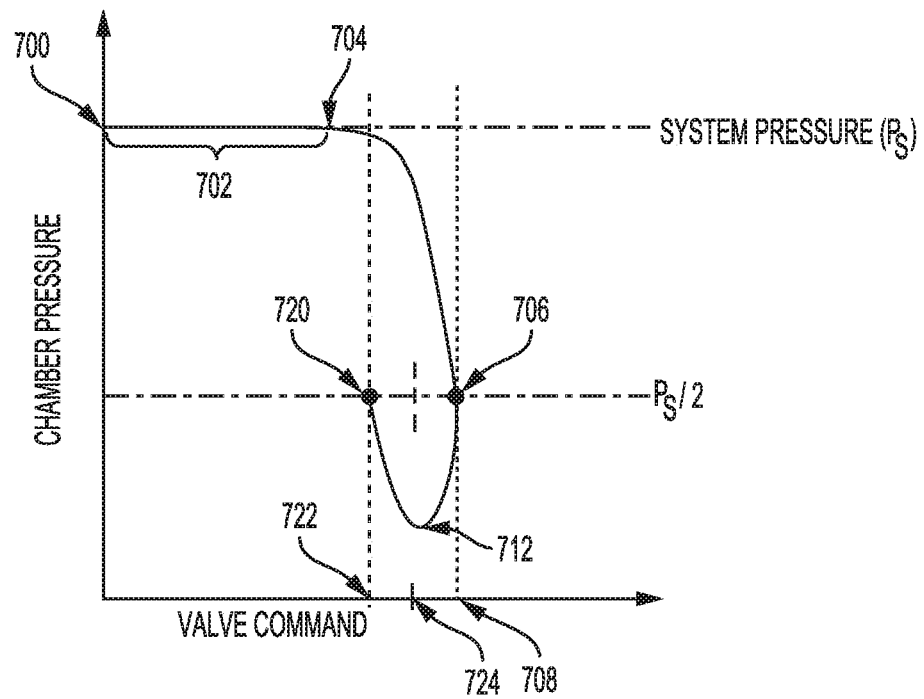
FIG. 7A illustrates work port pressure variation with valve command during determination of null bias, in accordance with an example implementation.
Figure 7B:
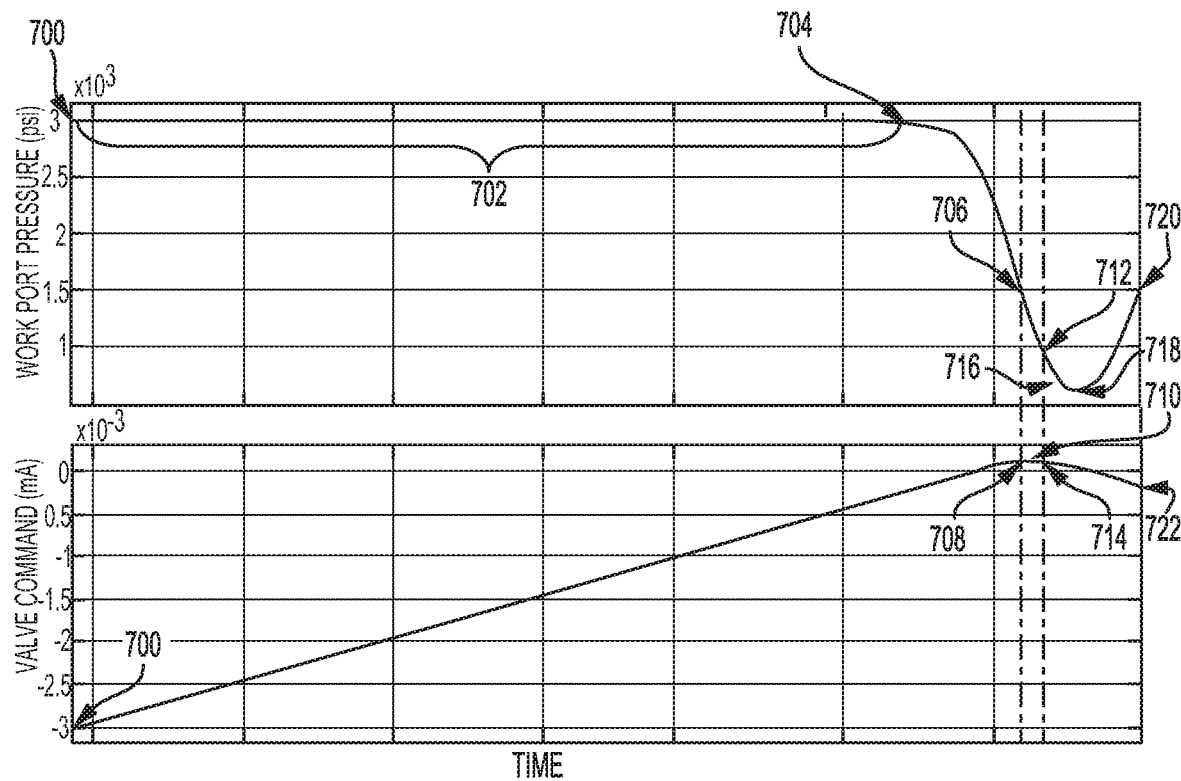
FIG. 7B illustrates pressure variation and valve command variation with time during determination of null bias, in accordance with an example implementation.

FIGS. 6A-6C illustrate determination of null bias for a valve, in accordance with an example implementation. FIG. 7A illustrates pressure variation with valve command during determination of null bias, in accordance with an example implementation. FIG. 7B illustrates work port pressure variation and valve command variation with time during determination of null bias, in accordance with an example implementation. Specifically, the top portion of FIG. 7B shows work port pressure variation with time, and the bottom portion of FIG. 7B shows valve command variation with time. FIGS. 6A-6C, FIG. 7A, and FIG. 7C will be described together.

In FIGS. 6A, 6B, and 6C, the solenoid 532 and the rod 534 are not shown in order to reduce visual clutter in the drawings. However, reference here to motion of the spool 516 indicates that a command is sent to a solenoid or some other actuation system to move the spool 516.

As shown in FIG. 6A, the valve 502 is connected to a hydraulic actuator 600. In one example, the actuator 600 could be the actuator 410 and the process of determining the null bias described with reference to FIGS. 6A-6C, 7A, and 7B might be implemented on the robot. In another example, the actuator 600 could be an actuator that is set up in a laboratory environment, and the process of determining the null bias described with reference to FIGS. 6A-6C, 7A, and 7B might be implemented in the laboratory environment prior to installation of the valve 502 in the robot.

The actuator 600 includes a piston 602 slidably accommodated within a cylinder of the actuator 600. The piston 602 includes a piston head 604 and a rod 606 extending from the piston head 604 along a central axis direction of the actuator 600. The piston head 604 divides the inside of the actuator 600 into two chambers, a first chamber 608 and a second chamber. As depicted in FIGS. 6A-6C, the second chamber has a zero volume, and is thus not depicted, because the piston 602 is extend all the way to an end of its stroke in FIGS. 6A-6C. A high pressure fluid source 610 is configured to provide pressurized fluid.

As an initial step, a valve command signal is sent to the valve 502 to move the spool 516 to one side of the null position of the spool 516 as shown in FIG. 6A. The signal may be provided by a controller of a robot, or by a controller in the laboratory environment. As a result, the source 610 provides fluid through the work port 546 to the chamber 608, and the piston 602 thus extends. The piston 602 extends until it reaches the end of the stroke (i.e., the piston 602 is deadheaded) as depicted in FIG. 6A.

When the piston 602 reaches the end of the stroke, hydraulic fluid will not flow from the source 610 to the chamber 608 because the piston 602 cannot extend further. Because there is no flow through the valve 502, there is not going to be any hydraulic pressure drop across the valve 502. Thus, a pressure level at the work port 546 and the chamber 608 would be substantially equal to system pressure Ps of fluid supplied from the source 610. The term "substantially" is used herein to indicate that the pressure level is within a threshold pressure value, e.g., 50 pounds per square inches (psi), from Ps.

This state is represented on FIGS. 7A and 7B by a point 700. As shown in FIG. 7B, the work port pressure at point 700 is 3000 psi, which is the system pressure. The pressure level at the work port 546 may be measured by way of a pressure sensor 611 that could be mounted at the work port 546 or at the chamber 608, for example. The pressure variation illustrated in FIGS. 7A and 7B may be indicated to the controller by the pressure sensor 611.

Then, a the signal to the valve may be gradually changed so as to cause the spool 516 to gradually move in a first direction represented by an arrow 612 shown in FIG. 6A within the body 518 of the valve 502. The term "gradually" is used herein to indicate an incremental value of current or voltage (e.g., 1 milli amperes (mA) per second, 10% of rated current per second, etc.). In response to such gradual change in the valve command, the spool 516 gradually moves (to the left in FIG. 6A) linearly within the body 518. Pressure level at the work port 546 may remain substantially at Ps (i.e., 3000 psi) as shown by region 702 shown in FIGS. 7A and 7B until the spool 516 reaches and crosses the null position as shown in FIG. 6B.

As the spool 516 reaches and crosses the null position, the pressure level at the work port 546 decreases from Ps until it reaches a pressure level that is, for example, half of Ps $$\left(i.e., \frac{P_S}{2}\right).$$

In FIGS. 7A and 7B, the pressure level at the work port 546 starts to decrease at point 704 and $$\text{reaches} \frac{P_S}{2} \approx 1500 \text{ psi}$$

at point 706. The valve command signal corresponding to point 706 is represented by point 708 in FIG. 7B.

The valve command at the point 708 is then maintained for a particular predefined period of time (e.g., 0.05 seconds). In other words, the spool 516 dwells in the place reached in FIG. 6B for the predefined period of time. Such dwelling is also represented in the bottom portion of FIG. 7B by a region 710 where the valve command is maintained at the same value reached at the point 708.

As the valve command is maintained in the region 710, the work port pressure further decreases to a value less than $$\frac{P_S}{2}.$$

As shown in FIGS. 7A and 7B, the work port pressure level decreases to a value represented by point 712 (e.g., ≈900 psi as shown in the top portion of FIG. 7B) below the point 706. Point 714 on the bottom portion of FIG. 7B represents the valve command that corresponds to the point 712 on the top portion of FIG. 7B. The valve command at point 714, at the end of dwelling period of time, is substantially the same (e.g., within a threshold value from) the valve command at point 712.

After the dwelling period, the valve command to the valve 502 may be gradually changed in the opposite direction so as to cause the spool 516 to gradually move in a second direction represented by an arrow 614 shown in FIG. 6B opposite to the first direction represented by the arrow 612. In response to such gradual change in the valve command, the spool 516 gradually moves (to the right in FIG. 6B) linearly within the body 518. Initially, pressure level at the work port 546 continues to decrease as shown by region 716 in FIG. 7B because the land 540 of the spool 516 may still be within an overlapping zone at the work port 546. In other words, the land 540 may still be blocking the work port 546, and thus the source 500 may not yet be hydraulically connected to the work port 546. However, at point 718, pressure level at the work port 546 starts to increase.

The pressure level at the work port 546 continues to increase until it reaches point 720 at which the pressure level at the work port 546 again reaches as the land 540 starts to clear the overlapping zone at the work port 546 as shown in FIG. 6C. As shown in FIGS. 7A and 7B, the point 720 is reached at a valve command represented by point 722.

The null bias is then determined as an average of the valve command represented by the point 708 at which the pressure level at the work port 546 initially reaches $$\frac{P_S}{2}$$

and the valve command represented by the point 722 at which the pressure level at the work port 546 again reaches $$\frac{P_S}{2}.$$

Determining the null bias this way increases the likelihood that the null bias is accurate. Therefore, the likelihood that a signal having this null bias value, when provided to the valve 502, would place the spool 516 at the null position increases.

In the description above, the average is taken between two valve commands corresponding to the work port pressure being $$\frac{P_S}{2}.$$

This $$\frac{P_S}{2}$$

value is used as an example. Other values could be used. For example, the signal to the valve 502 may be gradually changed until the pressure level at the work port 546 decreases to a value of $$\frac{2P_S}{3}.$$

Then, the signal may be maintained for a particular period of time, and then reversed until pressure level at the work port 546 again reaches $$\frac{2P_S}{3}.$$

The null bias could be determined as the average of two valve commands corresponding to the two instances of reaching $$\frac{2P_S}{3}.$$

Other pressure values could be used as well.

In FIGS. 6A-6C, the valve 502 is shown as hydraulically connected to the actuator 600 that is deadheaded, i.e., the piston 602 is extended all the way to one end of the stroke. In another example implementation, the valve 502 might not be connected to an actuator. Instead, the work port 546 may be blocked in a different way (e.g., blocked by a pressure sensor mounted in the work port 546, a plug, etc.). The method described above would be implemented in a similar manner to determine the null bias by measuring pressure at the work port 546 while the valve command is gradually changed back and forth as described.

V. Determining and Updating Null Bias on the Robot

Value of the null bias may drift overtime while the robot is in operation due to changes in supply pressure, operating temperatures, wear, changes in hydraulic fluid cleanliness, among other factors. Such drift may cause inaccuracies in operating the actuators of the robot. For example, the controller may have access to a pre-stored value for the null bias signal that the controller uses to place the spool at null position to prevent motion of an actuator. Due to drift, however, the null bias signal that the controller provides to the valve may not place the spool at the null position. The spool may thus be slightly shifted form the null position, causing the actuator to move.

Thus, updating the null bias signal overtime to compensate for any drift may be desirable to maintain accuracy of operation of the robot. Disassembling the valve to determine the drift may cause unwanted downtime for the robot. Thus, determining and updating the null bias signal in real-time on the robot may be desirable.

In example, the controller of the robot may operate the actuators in a closed loop manner so as to accurately control speed and force of the actuators. The controller may use motion of the robot while the robot is operating to infer the null bias of the valve. During operation of the robot, the actuators may alternate between moving and stopping several times a second. For instance during a walking cycle, an actuator (e.g., the actuator 410) controlling motion of a link (e.g., the member 404) in the leg of the robot may go through cycles of having positive velocities, negative velocities, and stopping. While going through these cycles, the spool of the valve controlling the actuator may go through the null position several times.

In an example, if a flow sensor is mounted on each actuator, the controller may determine that the spool is at its null position when the flow sensor indicates zero flow going through the valve to the actuator. If the robot is not equipped by flow sensors, the controller may infer that the spool is at its null position by looking at other sensor measurements.

For example, the actuator (e.g., the actuator 410) may be equipped with a position sensor that indicates position of a piston of the actuator. Speed of the actuator can be determined by calculating a time derivative of the position sensor signal. Speed of the joint (e.g., the joint 406) controlled by the actuator can also be determined from the speed of the actuator because of the geometric relationship between the linear motion of the actuator and the rotation of the corresponding joint. In another example, a joint, such as the joint

406, may have a rotary encoder that indicates rotary position of the joint. The rotary speed of the joint can be determined based on the rotary position sensor signal. If the actuator position sensor or the joint position sensor indicates that the joint has zero velocity, then the controller may infer that there is no flow going through the valve to the actuator.

However, having zero actuator or joint velocity (i.e., zero flow through the valve) is not sufficient for the controller to infer that the spool is at the null position. A zero flow state can be experienced at several different spool positions depending on a force level at the actuator. For instance, the robot may be pushing on the ground or an object by one of the robot's members (e.g., arm or foot). The robot may apply a force on the object, but the object might not move (e.g., the object is heavy, the object is a ground surface that does not move when pushed upon, etc.). The spool may be shifted away from the null position to allow pressurized fluid from the source of pressurized fluid to apply a force on the piston, thus enabling the actuator to apply a force on the object. In this case, the actuator may not be moving, i.e., actuator and joint have zero speed, while the spool is not at the null position.

Thus, to determine whether the spool is at the null position, the controller may consider the force applied, or experienced, by the actuator in addition to the speed of the actuator or the joint. For example, the actuator may be equipped by pressure sensors indicating pressure level at the chambers of the actuator. For example, the actuator 410 shown in FIG. 5A may include pressure sensors measuring pressure levels in the chambers 512 and 514. The force F applied to or by the actuator 410 can be estimated using the following equation:

$$F = P_{C1}A_1 - P_{C2}A_2 \quad (1)$$

where $P_{C1}$ is the fluid pressure in the chamber 514 applied to piston area $A_1$ in the chamber 514 and $P_{C2}$ is the fluid pressure applied to piston area $A_2$ in the chamber 512. In another example, the actuator may have a force sensor or a load cell that indicates the force applied, or experienced, by the actuator.

Further, if the robot is not activated and the hydraulic system is not operational, speed of the actuator would be zero and the force applied to or by the actuator would also be zero. However, the spool of the valve may be at any linear position. Therefore, when inferring whether the spool is at the null position, the controller may also take into consideration whether the hydraulic system is operational. As an example, a pressure sensor at the source of pressurized fluid (i.e., at the pump or accumulator providing fluid to the actuators through the valves) may indicate whether the hydraulic system is operational. For instance, if the hydraulic system is operational, then the pressure of fluid at the source may be greater than a threshold pressure (e.g., >2500 psi or any other predetermined pressure value based on the maximum system pressure).

Thus, the controller may infer that the spool is at the null position when the robot is at a particular state that meets at least three conditions: (i) velocity of the actuator is less than a threshold velocity, e.g., less than 0.005 meter/seconds (m/s) indicating that the actuator is substantially stationary, (ii) a force applied, or experienced, by the actuator is less than a threshold force, e.g., less than 400 newtons, and (iii) a pressure level of hydraulic fluid at the source of pressurized fluid is above a threshold pressure level, e.g., above 2500 psi. In some examples, the controller may receive any other type of information indicating that the hydraulic system is operational. For instance, if an electric motor or an engine runs a pump which supplies pressurized fluid to the hydraulic system, then the controller may infer that the hydraulic system is operational if the motor or engine is running. In this case, the controller may infer that the spool is at the null position when the robot is at a particular state that meets the first and second conditions.

In addition to these conditions, the controller may also take into consideration other factors such as dynamics of the spool, i.e., times the spool takes to reach a particular commanded position after a valve command is provided to the valve. When the controller infers that the spool is at the null position, the controller may determine the corresponding valve command that caused the valve to be at the null position, and thus determines the null bias signal.

Figure 8:
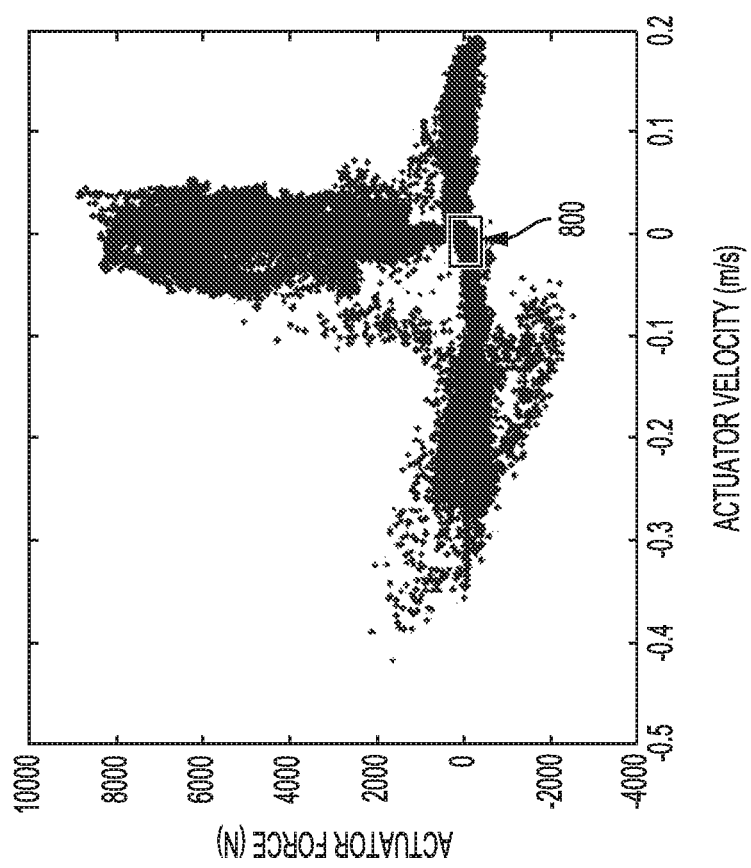
FIG. 8 illustrates operating points for an actuator of a robot over a period of time, in accordance with an example implementation.
Figure 9:
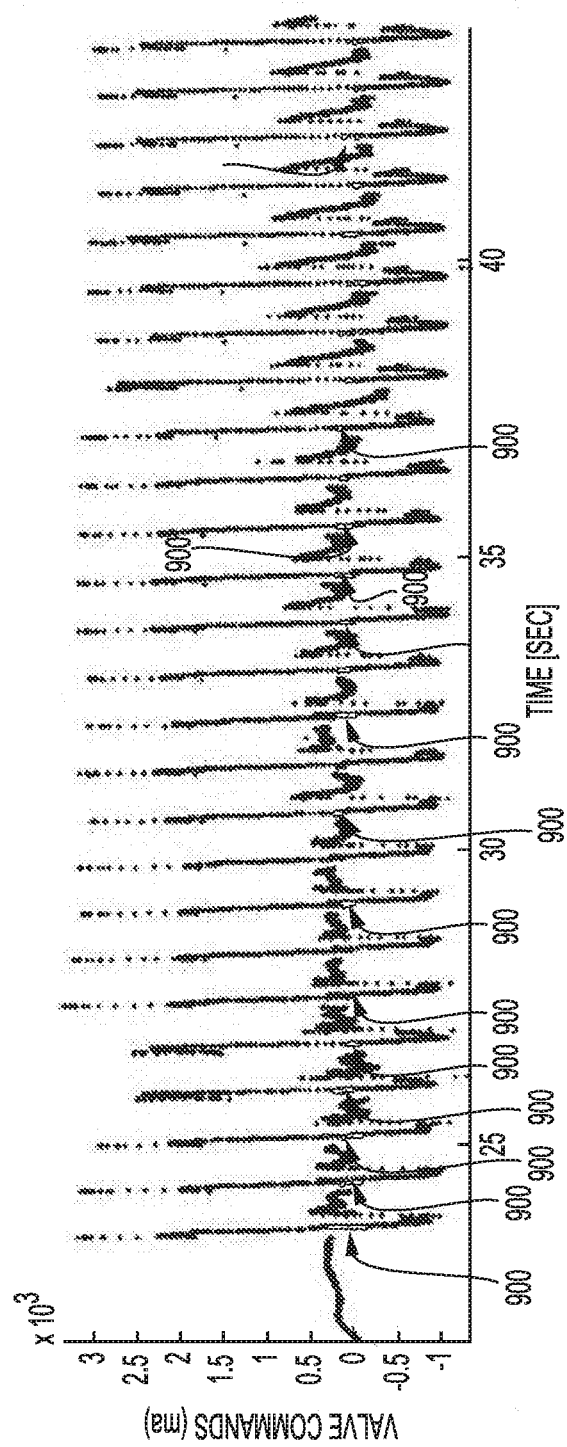
FIG. 9 illustrates valve command variation corresponding to the operating points of FIG. 8, in accordance with an example implementation

FIG. 8 illustrates operating points for an actuator of a robot over a period of time, in accordance with an example implementation. FIG. 9 illustrates valve commands corresponding to the operating points of FIG. 8, in accordance with an example implementation. The data shown in FIGS. 8 and 9 were captured for a valve and an actuator controlling knee joint (e.g., the joint 406) of a quadruped robot similar to the robot such as the quadruped robot 200.

The data graphed in FIG. 8 indicates the actuator velocity in m/s on the x-axis and actuator force in newtons (N) on the y-axis during operation of the robot. Because these operating points have been captured during operation of the robot, the hydraulic system was operation, and thus the third condition mentioned above is met, i.e., a pressure level of hydraulic fluid at the source of pressurized fluid is above a threshold pressure.

Data or operating points enclosed in box 800 shown in FIG. 8 are operating points that meet the conditions (i) and (ii) mentioned above, i.e., velocity of the actuator is less than a threshold velocity and the actuator force is less than a threshold force. Thus, the controller of the robot may infer that at these operating points, the spool has been at the null position. The controller may thus determine the valve commands that correspond to the operating points within the box 800 to determine the null bias.

FIG. 9 shows a plot of variation of valve command over time during operation of the robot that has produced the actuator velocity and forces shown in FIG. 8. Regions 900 of the plot are valve commands that correspond to and induce the operating points enclosed in the box 800. The regions 900 are shown as white areas in the otherwise black plot of the value command variation. Not all such regions are referenced by the reference 900 to reduce visual clutter in the drawing.

As shown in FIG. 9, multiple valve commands (indicated by the multiple regions 900) placed the spool at the null position and induced the operating points within the box 800. The controller may use these valve commands in various ways. For example, each time or each operating states that meets the conditions mentioned above are met, the controller may determine the corresponding valve command and update the null bias signal based on the valve command, e.g., the valve command becomes the updated null bias signal value.

In another example, the controller may identify the valve commands that correspond to the operating points or states that achieve the above-mentioned three conditions over a period of time (e.g., between initiation and completion of a particular task) such as the regions 900. The controller may then determine a range of values for the valve commands that place the spool at the null position. The controller may use this data in several ways to determine and update the null bias.

For example, the controller may determine an average of these valve commands to determine the null bias or update a previous null bias. In another example, the controller may determine maximum (e.g., largest) and minimum (e.g., smallest) valve commands that placed the spool at the null position, and then use these two values to determine the null bias. For instance, the controller may determine the null bias to be an average of the maximum and minimum valve commands.

In an example, in determining the null bias signal, the controller may assign larger weights to more recent valve commands while assigning smaller weights or exclude older sets of valve commands. For instance, the weights could decay exponentially going back in time so as to emphasize more recent valve commands that placed the spool at the null position, while putting less emphasis on older valve commands.

In still another example, the controller may apply a filter (moving average, rolling average, running average, a second order filter, etc.) to the valve commands determined to place the spool at null position over a period of time. As a specific example of how a moving average could be implemented by the controller, the controller may collect a series of the valve commands, i.e., the valve commands within the regions 900, over time. The controller may then determine a first element of the moving average by taking an average of an initial subset of valve commands. Then, the controller may modify the subset by shifting forward, i.e., excluding the first valve command of the series and including the next valve command following the original subset in the series. The controller thus creates a new subset of valve commands, which is then averaged. This process is repeated over the entire data series. The controller continues to determine new averages as more data are collected and more operating points like the operating points in the box 800 are identified. In this manner, the moving average is a set of valve commands, each of which is the average of the corresponding subset of a larger set of valve commands. The moving average may also use unequal weights for each valve command in the subset to emphasize particular values in the subset.

This analysis and null bias determination may be performed by the controller on a continuous basis or periodically for all valves in the robot so as to continuously update the null bias and maintain accuracy of valve control. For example, after the robot operates for a particular number of hours, the controller may initiate a 1 minute run of the robot dedicated to identifying null bias shifts and updating the null bias. During that 1 minute, the robot may perform a predetermined sequence of actions, and the controller collects operating points similar to the operating points in the box 800 and the corresponding valve commands in the regions 900. The controller may then determine whether a null bias shift occurred and whether to update a previously determined null bias.

Further, the controller may identify any trends in the null bias over time for purposes of fault or failure detection. For instance, if a large null bias shift occurs, i.e., a shift that exceeds a predetermined threshold shift (e.g., 5 milli amperes), the controller may determine that the valve or the robot may be due for maintenance or repair. A large shift may, for example, indicate that cleanliness of the hydraulic fluid may have deteriorated, and the fluid may be due for change.

VI. Example Methods

Figure 10:
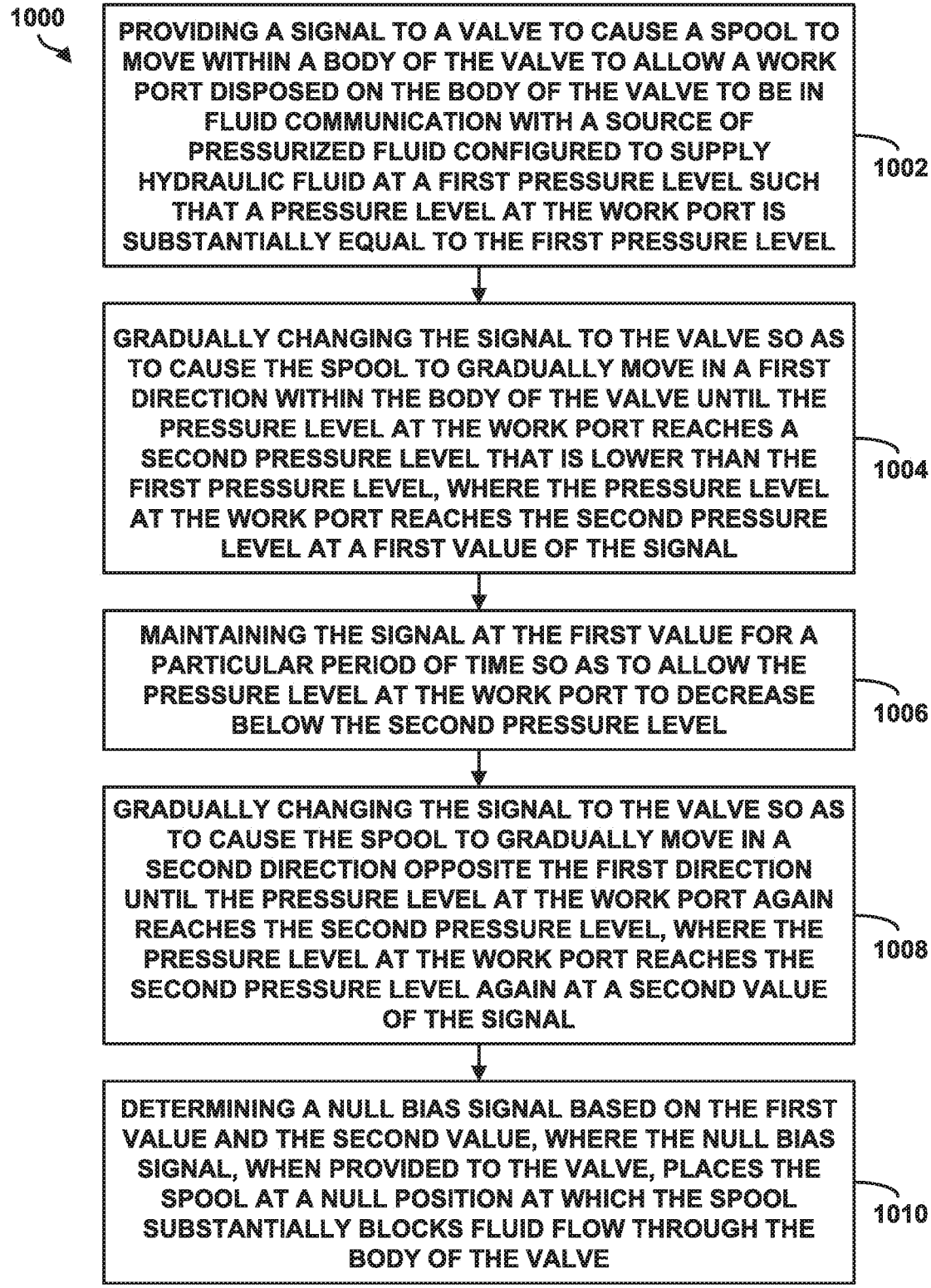
FIG. 10 is a flow chart of a method for determining null bias, in accordance with an example implementation.

FIG. 10 is a flow chart 1000 of a method for determining null bias, in accordance with an example implementation.

The flow chart 1000 corresponds to the description above with respect to FIGS. 6A-6C and 7A-7B. The flow chart 1000 may include one or more operations, or actions as illustrated by one or more of blocks 1002-1010. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 1000 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 1000 and other processes and operations disclosed herein, one or more blocks in FIG. 10 may represent circuitry or digital logic that is arranged to perform the specific logical operations in the process.

At block 1002, the flow chart 1000 includes providing a signal to a valve to cause a spool to move within a body of the valve to allow a work port disposed on the body of the valve to be in fluid communication with a source of pressurized fluid configured to supply hydraulic fluid at a first pressure level such that a pressure level at the work port is substantially equal to the first pressure level.

In line with the discussion above related to FIGS. 6A-6C and 7A-7B, a controller (e.g., a controller of a robot or a computing device in a testing laboratory) provides a signal to a valve (e.g., the valve 502) to shift a spool (e.g., 516) with a body (e.g., the body 518) of the valve. The spool may be shifted to one side so as to allow a work port (e.g., the work port 546) to be in fluid communication with a source (e.g., the source 610) of pressurized fluid. The source is configured to provide fluid at a first pressure level, e.g., system pressure Ps. In order to cause a pressure level at the work port to be substantially equal (e.g., within a threshold pressure value) from the first pressure level, hydraulic fluid is precluded from flowing through the valve so as to prevent any pressure drop across the valve. This can be achieved by, for example, blocking the work port or by coupling the valve to an actuator (e.g., the actuator 600), where a piston of the actuator is extended all the way to the end of the stroke to prevent flow across the valve. A pressure sensor (e.g., the pressure sensor 611) may provide information to the controller indicating that the pressure level at the work port is substantially equal to the first pressure level of the source.

At block 1004, the flow chart 1000 includes gradually changing the signal to the valve so as to cause the spool to gradually move in a first direction within the body of the valve until the pressure level at the work port reaches a second pressure level that is lower than the first pressure level, where the pressure level at the work port reaches the second pressure level at a first value of the signal. As described with respect to FIGS. 6A-6B, the controller gradually (e.g., in increments of 0.1% of rated current) changes the signal provided to the valve so as to cause the spool to move in a first direction (e.g., direction of arrow 612) to a center region within the body of the valve. As the spool moves, the pressure level at the work port may remain at the first pressure level for a period of time (e.g., period of time represented by the region 702 in FIGS. 7A-7B).

As the spool reaches and crosses the null position (as shown in FIG. 6B) while moving in the first direction, the pressure level at the work port decreases (e.g., at point 704) until it reaches a second pressure level (e.g., $$\frac{P_S}{2}$$

as shown by the point 706 in FIGS. 7A-7B) that is less than the first pressure level (Ps). The pressure level at the work port reaches the second pressure level at a first value of the signal (e.g., the first value of the signal is the valve command signal represented by point 708 in FIGS. 7A-7B).

At block 1006, the flow chart 1000 includes maintaining the signal at the first value for a particular period of time so as to allow the pressure level at the work port to decrease below the second pressure level. The first value of the signal (e.g., the valve command at the point 708) is maintained for a particular predefined period of time (e.g., 0.5 seconds). The spool thus dwells in the place reached in FIG. 6B for the predefined period of time (such dwelling is also represented in the bottom portion of FIG. 7B by the region 710 where the valve command is maintained at the same value reached at the point 708). As the first value of the signal is maintained, the work port pressure decreases further (e.g., decreases to a value less than $$\frac{P_S}{2}$$

as represented by point 712 FIGS. 7A-7B).

At block 1008, the flow chart 1000 includes gradually changing the signal to the valve so as to cause the spool to gradually move in a second direction opposite the first direction until the pressure level at the work port again reaches the second pressure level, where the pressure level at the work port reaches the second pressure level again at a second value of the signal.

After the dwelling period, the valve command to the valve may be gradually changed in the opposite direction so as to cause the spool to gradually move in a second direction (e.g., the direction represented by the arrow 614 shown in FIG. 6B) opposite to the first direction (e.g., the direction represented by the arrow 612). In response to such gradual change in the valve command, the spool gradually moves (e.g., to the right in FIG. 6B) linearly within the body of the valve. Initially, pressure level at the work port may continue to decrease (e.g., as shown by region 716 in FIG. 7B). However, at a particular point (e.g., the point 718 in FIG. 7B), the pressure level at the work port starts to increase.

The pressure level at the work port 546 continues to increase until it again reaches the second pressure level (e.g., again reaches $$\frac{P_S}{2}$$

as represented by the point 720). The second pressure level is again reached at a valve command having a second value (e.g., the valve command represented by point 722).

At block 1010, the flow chart 1000 includes determining a null bias signal based on the first value and the second value, where the null bias signal, when provided to the valve, places the spool at a null position at which the spool substantially blocks fluid flow through the body of the valve.

For example, the null bias may be determined as an average of the first value and the second value (e.g., an average of the valve command represented by the point 708 and the valve command represented by the point 722). Determining the null bias this way may increase the likelihood that the null bias is accurate.

FIG. 11 is a flow chart 1100 of another method for determining null bias, in accordance with an example implementation. The flow chart 1100 corresponds to the description above with respect to FIGS. 8 and 9. The flow chart 1100 may include one or more operations, or actions as illustrated by one or more of blocks 1102-1106. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the flow chart 1100 and other processes and operations disclosed herein, the flow chart shows operation of one possible implementation of present examples. In this regard, each block may represent a module, a segment, or a portion of program code, which includes one or more instructions executable by a processor or a controller for implementing specific logical operations or steps in the process. The program code may be stored on any type of computer readable medium or memory, for example, such as a storage device including a disk or hard drive. The computer readable medium may include a non-transitory computer readable medium or memory, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example. In addition, for the flow chart 1100 and other processes and operations disclosed herein, one or more blocks in FIG. 11 may represent circuitry or digital logic that is arranged to perform the specific logical operations in the process.

At block 1102, the flow chart 1100 includes identifying, by a controller of a robot, an operating state at which (i) a velocity of a hydraulic actuator configured to operate a movable member of the robot is less than a threshold velocity, (ii) a force applied, or experienced, by the hydraulic actuator is less than a threshold force, and (iii) a pressure level of hydraulic fluid at a source of pressurized fluid is above a threshold pressure level.

In line with the discussion above, the null bias may drift overtime while the robot is in operation due to changes in supply pressure, operating temperatures, wear, changes in hydraulic fluid cleanliness, among other factors. Determining and updating the null bias signal overtime to compensate for any drift may be desirable to maintain accuracy of operation of the robot.

A controller of the robot may use motion of the robot while the robot is operating to infer the null bias of a valve. During operation of the robot, the actuators may alternate between moving and stopping several times a second. For instance during a walking cycle, an actuator controlling motion of a link in the leg of the robot may go through cycles of having positive velocities, negative velocities, and stopping. While going through these cycles, a spool of the valve controlling the actuator may go through the null position several times.

In an example, the controller may determine that the spool of a valve is at its null position when speed of an actuator controlled by the valve or speed of a joint controlled by the actuator is close to zero velocity (e.g., the speed is less than a threshold speed). When the speed is zero or close to zero, the controller may infer that there is no flow going through the valve to the actuator. However, having zero actuator or joint velocity (i.e., zero flow through the valve) may not be sufficient for the controller to infer that the spool is in the null position. A zero flow state can be experienced at several different spool positions depending on a force level at the actuator.

Thus, to determine whether the spool is at the null position, the controller may consider the force applied, or experienced, by the actuator in addition to the speed of the actuator or the joint. If at an operating point where the speed of the actuator is less than a threshold speed, the force applied or experienced by the actuator is less than a threshold force, then the controller may infer that the spool is at its null position in that operating state.

Further, in addition to actuator speed and force, the controller may also take into consideration whether the robot and the hydraulic system is operational. As an example, a pressure sensor at the source of pressurized fluid (i.e., at the pump or accumulator providing fluid to the actuators through the valves) may indicate whether the hydraulic system is operational. For instance, if the hydraulic system is operational, then the pressure of fluid at the source may be greater than a threshold pressure (e.g., >2500 psi or any other predetermined pressure value based on the maximum system pressure).

Thus, the controller may infer that the spool is at the null position when the robot is at a particular state that meets three conditions: (i) velocity of the actuator is less than a threshold velocity, e.g., less than 0.005 meter/seconds (m/s) indicating that the actuator is substantially stationary, (ii) a force applied, or experienced, by the actuator is less than a threshold force, e.g., less than 400 newtons, and (iii) a pressure level of hydraulic fluid at the source of pressurized fluid is above a threshold pressure level, e.g., above 2500 psi. As described above with respect to FIG. 8, operating points enclosed in the box 800 shown in FIG. 8 are operating points that meet these three conditions. In some examples, if the controller receives any other type of information indicating that the hydraulic system is operational, then the controller may infer that the spool is at the null position when the robot is at a particular state that meets the first and second conditions.

At block 1104, the flow chart 1100 includes determining a valve command that corresponds to the operating state, where the valve command is provided to a valve configured to control flow to and from the hydraulic actuator, where the valve includes a spool movable within a body of the valve, and where the valve command causes the spool to move within a body of the valve to a position that induces the operating state.

As described above with respect to FIG. 9, the controller may determine valve commands (e.g., the regions 900) that correspond to the operating points/states identified at block 1102. These valve commands likely placed the spool of the valve at the null position and thus induced the occurrence of the identified operating states.

At block 1106, the flow chart 1100 includes determining a null bias signal based on the valve command, where the null bias signal, when provided to the valve, places the spool at a null position at which the spool substantially blocks fluid flow through the body The controller may use the valve commands determined at block 1106 in various ways to determine and update the null bias. For example, each time an operating state that meets the conditions mentioned at block 1102 is induced, the controller may determine the corresponding valve command and update the null bias signal based on the valve command, e.g., the valve command becomes the updated null bias signal value.

In another example, the controller may identify the valve commands that correspond to the operating points or states that achieve the three conditions over a period of time (e.g., between initiation and completion of a particular task). The controller may then determine a range of values for the valve commands that place the spool at the null position. The controller may use this data in several manners to determine and update the null bias.

For example, the controller may determine an average of these valve commands to determine the null bias or update a previous null bias. In another example, the controller may determine maximum and minimum valve commands that placed the spool at the null position, and then use these two values to determine the null bias. For instance, the controller may determine the null bias to be an average of the maximum and minimum valve commands.

In an example, in determining the null bias signal, the controller may assign larger weights to more recent valve commands while assigning smaller weights or exclude older sets of valve commands. For instance, the weights could decay exponentially going back in time so as to emphasize more recent valve commands that place the spool at the null position, while putting less emphasis on older valve commands.

The controller may also exclude subsets of valve commands based on when the subset of valve commands were provided to the valve. For instance, if a subset of valve commands were provided to the valve before a particular point in time in the past, then the controller may exclude these valve commands and emphasize more recent valve commands that placed the spool at the null position. Further, the controller may exclude data points that appear to be outliers, i.e., exclude valve commands that lies outside (e.g., are much smaller or larger than) most of the other valve commands in a set of data.

In still another example, the controller may apply a filter (moving average, rolling average, running average, a second order filter, etc.) to the valve commands that placed the spool at null position over a period of time.

This analysis and null bias determination may be performed by the controller on a continuous basis or periodically for all valves in the robot so as to continuously update the null bias and maintain accuracy of valve control. For example, after the robot operates for a particular number of hours, the controller may initiate a 1 minute run of the robot dedicated to identifying null bias shifts and updating the null bias. During that 1 minute, the robot may perform a predetermined sequence of actions, and the controller collects operating points that meet the conditions of block 1102 and the corresponding valve commands. The controller may then determine whether a null bias shift occurred and whether to update a previously determined null bias.

Further, the controller may identify any trends in the null bias over time for purposes of fault or failure detection. For instance, if a large null bias shift occurs, the controller may determine that the valve or the robot may be due for maintenance.

VII. Conclusion

The arrangements described herein are for purposes of example only. As such, those skilled in the art will appreciate that other arrangements and other elements (e.g., machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Also, the terminology used herein is for the purpose of describing particular implementations only, and is not intended to be limiting.

What is claimed is:

1. A method comprising:
   generating, by data processing hardware of a robot, a null bias signal, the null bias signal configured to shift a spool of a valve communicating with a hydraulic actuator of the robot to a null position, the null position preventing motion of the hydraulic actuator, wherein the null bias signal is generated by:
   receiving, at the data processing hardware, a first sensor measurement indicative of a velocity of the hydraulic actuator and a second sensor measurement indicative of a force at the hydraulic actuator;
   determining, by the data processing hardware, that the first sensor measurement indicates that the hydraulic actuator is stationary;
   determining, by the data processing hardware, that the force of the second sensor measurement satisfies a threshold force; and
   determining, by the data processing hardware, the null bias signal based on the first sensor measurement and the second sensor measurement, and
   wherein the null bias signal, when provided to the valve, places the spool at the null position.

2. The method of claim 1, further comprising:
   obtaining, by the data processing hardware, a pre-stored value of the null bias signal; and
   updating, by the data processing hardware, the pre-stored value of the null bias signal based on the generated null bias signal.

3. The method of claim 2, wherein the pre-stored value of the null bias signal fails to place the spool at the null position.

4. The method of claim 3, further comprising:
   determining, by the data processing hardware, that a difference between a valve position associated with the pre-stored value of the null bias signal and a valve position associated with a value of the generated null bias signal satisfies a threshold shift; and
   determining, by the data processing hardware, that the robot is due for maintenance in response to determining that the difference satisfies the threshold shift.

5. The method of claim 1, wherein at least one of a position sensor or a rotary encoder generates the first sensor measurement.

6. The method of claim 1, wherein at least one of a pressure sensor, a force sensor, or a load cell generates the second sensor measurement.

7. The method of claim 1, wherein receiving the first sensor measurement and the second sensor measurement comprises:
   receiving the first sensor measurement and the second sensor measurement for each of a plurality of operating states for the hydraulic actuator; and
   determining the null bias signal based on the first sensor measurement and the second sensor measurement for each of the plurality of operating states.

8. The method of claim 7, wherein determining the null bias signal further comprises applying a moving average filter to the first and second sensor measurements for each of the plurality of operating states.

9. The method of claim 7, wherein determining the null bias signal comprises:
   determining a largest null bias signal and a smallest null bias signal of the plurality of operating states; and
   determining the null bias signal based on the largest null bias signal and the smallest null bias signal.

10. The method of claim 7, wherein determining the null bias signal comprises:
    assigning respective weights to the first sensor measurement and the second sensor measurement for each of the plurality of operating states, the respective weights include larger weights assigned to more recent operating states compared to weights assigned to older operating states; and
    determining, by the data processing hardware of the robot, the null bias signal based on the assigned respective weights.

11. A robot comprising:
    a movable member;
    a hydraulic system comprising a hydraulic actuator configured to operate the movable member, a valve configured to control flow to and from the hydraulic actuator, and a source of pressurized hydraulic fluid; and
    a controller configured to generate a null bias signal, the null bias signal configured to shift a spool of the valve communicating with the hydraulic actuator to a null position, the null position preventing motion of the hydraulic actuator, wherein the controller generates the null bias signal by performing operations comprising:

receiving a first sensor measurement indicative of a velocity of the hydraulic actuator and a second sensor measurement indicative of a force at the hydraulic actuator;

determining that the first sensor measurement indicates that the hydraulic actuator is stationary;

determining that the force of the second sensor measurement satisfies a threshold force; and determining the null bias signal based on the first sensor measurement and the second sensor measurement, and wherein the null bias signal, when provided to the valve, places the spool at the null position.

12. The robot of claim 11, wherein the operations further comprise:

obtaining a pre-stored value of the null bias signal; and updating the pre-stored value of the null bias signal based on the generated null bias signal.

13. The robot of claim 12, wherein the pre-stored value of the null bias signal fails to place the spool at the null position.

14. The robot of claim 13, wherein the operations further comprise:

determining that a difference between a valve position associated with the pre-stored value of the null bias signal and a valve position associated with a value of the generated null bias signal satisfies a threshold shift; and determining that the robot is due for maintenance in response to determining that the difference satisfies the threshold shift.

15. The robot of claim 11, wherein at least one of a position sensor or a rotary encoder generates the first sensor measurement.

16. The robot of claim 11, wherein at least one of a pressure sensor, a force sensor, or a load cell generates the second sensor measurement.

17. The robot of claim 11, wherein receiving the first sensor measurement and the second sensor measurement comprises:

receiving the first sensor measurement and the second sensor measurement for each of a plurality of operating states for the hydraulic actuator; and determining the null bias signal based on the first sensor measurement and the second sensor measurement for each of the plurality of operating states.

18. The robot of claim 17, wherein determining the null bias signal further comprises applying a moving average filter to the first and second sensor measurements for each of the plurality of operating states.

19. The robot of claim 17 wherein determining the null bias signal comprises:

determining a largest null bias signal and a smallest null bias signal of the plurality of operating states; and determining the null bias signal based on the largest null bias signal and the smallest null bias signal.

20. The robot of claim 17, wherein determining the null bias signal comprises:

assigning respective weights to the first sensor measurement and the second sensor measurement for each of the plurality of operating states, the respective weights include larger weights assigned to more recent operating states compared to weights assigned to older operating states; and determining the null bias signal based on the assigned respective weights.

* * * * *